United States Patent [19]
Wheatley

[11] Patent Number: 5,758,922
[45] Date of Patent: Jun. 2, 1998

[54] TONNEAU COVER WITH MAGNETIC ATTACHMENT

[76] Inventor: Donald G. Wheatley, 4451 Ford Rd., Ann Arbor, Mich. 48105

[21] Appl. No.: 708,316

[22] Filed: Sep. 4, 1996

[51] Int. Cl.$^6$ ........................................... B60P 7/04
[52] U.S. Cl. ........................................... 296/100; 160/368.1
[58] Field of Search ........................... 296/100, 101, 296/136; 160/354, 368.1, 327, 371, 380

[56] References Cited

U.S. PATENT DOCUMENTS

| | | | |
|---|---|---|---|
| 2,639,751 | 5/1953 | Flaherty | 296/136 X |
| 3,226,446 | 12/1965 | Coppock et al. | |
| 3,910,330 | 10/1975 | Johnson et al. | 296/136 X |
| 4,036,521 | 7/1977 | Clenet | 296/100 |
| 4,403,642 | 9/1983 | Morris | |
| 4,923,240 | 5/1990 | Swanson | 296/100 |
| 5,076,338 | 12/1991 | Schmeichel et al. | |
| 5,121,960 | 6/1992 | Wheatley | |
| 5,207,262 | 5/1993 | Rushford | |
| 5,230,377 | 7/1993 | Berman | 160/327 |
| 5,251,951 | 10/1993 | Wheatley | |
| 5,275,458 | 1/1994 | Barben et al. | 296/100 |
| 5,385,377 | 1/1995 | Girard | |
| 5,487,585 | 1/1996 | Wheatley | 296/100 |
| 5,522,635 | 6/1996 | Downey | 296/100 |
| 5,553,652 | 9/1996 | Rushford | 296/100 X |

FOREIGN PATENT DOCUMENTS

| | | | |
|---|---|---|---|
| 569039 | 11/1993 | European Pat. Off. | 296/100 |
| 2225599 | 8/1974 | France | |

*Primary Examiner*—Joseph D. Pape
*Attorney, Agent, or Firm*—Harness, Dickey & Pierce, P.L.C.

[57] ABSTRACT

A tonneau cover for covering an area of a vehicle bounded by upright walls of the vehicle in which a flexible cover sheet is attached to a frame rail mounted to the vehicle by the use of a pivot lever. The pivot lever has an inner or proximal end which engages an outward facing bearing surface of the frame rail. Once engaged, the sever is rotated outward and downward to apply tension to the cover sheet. The pivot lever is held to the rail in the downward pivoted position by complementary magnets carried by the pivot lever and the frame rail. The magnetic force resists the rotational moment applied to the pivot lever by the tension in the cover sheet.

18 Claims, 5 Drawing Sheets

TONNEAU COVER WITH MAGNETIC ATTACHMENT

BACKGROUND AND SUMMARY OF THE INVENTION

This invention relates to tonneau covers for enclosing the cargo area of a vehicle, such as a pickup truck, and in particular to a tonneau cover having a pivot lever for pulling the cover tight and a magnetic attachment to hold the pivot lever in place. The pivot lever enables the cover to be mounted with a relatively low force which remains consistent over a wide range of ambient temperatures.

Numerous mechanisms have been used to attach flexible sheet tonneau covers to pickup trucks. The most commercially popular mechanisms are snap fasteners and a continuous, hook fastener that engages about a flange to mount the tonneau cover flexible sheet. While tonneau covers employing such fastening devices have obtained commercial success, attachment and removal of these tonneau covers can sometimes be difficult. With snap fasteners, it is necessary to properly align the male and female halves of a large number of snap fasteners to completely attach the cover sheet. Furthermore, during cold temperatures, it may be difficult to pull the flexible sheet taut while aligning the individual portions of the snap fasteners.

The continuous hook fastener overcomes the difficulty of aligning multiple snap fasteners. It can still be difficult to attach the cover sheet in extremely cold conditions. This is due to the increased stiffness of the sheet and hook fastener as a result of cold temperatures.

Accordingly, it is an object of the present invention to provide a fastening mechanism which is easy to use over a larger range of ambient temperatures.

It is a further object to provide a fastening mechanism that requires a relatively low force to be applied by the user to mount the cover sheet.

The present invention provides a tonneau cover attaching mechanism which uses a pivot lever along the side edges of the flexible cover sheet. The proximal, inner end of the pivot lever is positioned against an outwardly facing bearing surface of a rail mounted to the cargo box. With the proximal end of the pivot lever seated against the bearing surface, the pivot lever is rotated outward and downward, pulling the flexible cover taut. The rotation of the pivot lever can be accomplished with the application of a downward force by the palms of the user. The pivot lever provides a significant mechanical advantage such that a relatively low downward force is required to pull the flexible cover taut.

Once the pivot lever is rotated downwardly and outwardly, a magnet carried by the pivot lever engages a magnet attached to the rail to hold the pivot lever in its downwardly rotated locked position. The magnetic force needed to hold the pivot lever in its downward, locked, position is only the force necessary to resist the tension in the tonneau cover, which acts to rotate the pivot lever upward. The tension in the tonneau cover, while it may be relatively high, acts against the pivot lever with a relatively short moment arm. By spacing the magnet outward from the proximal end of the pivot lever, the magnetic force operates over a large moment arm, thereby reducing or minimizing the magnetic force required to securely hold the pivot lever, and thus the cover sheet, in place.

The pivot lever is preferably an elongated plastic strip sewn to the edge of the cover sheet. It carries a magnet strip while the rail attached to the top of a cargo box wall carries another magnet strip. The rail is formed with the outward facing bearing surface for engagement with the proximal, inner, end or edge of the plastic strip. The cover sheet is mounted to the rail by placing the plastic strip's inner edge against the rail bearing surface and then rotating the strip downward and outward by pushing downward on the cover sheet edge and strip with the palms of your hands. The mounting operation can begin at one corner of the cover sheet and progress along the cover sheet edge to another corner. Alternatively, the mounting operation can start in the middle of one side of the cover sheet and work lengthwise to each corner. While an elongated pivot lever strip is preferred, it may be possible to use several spaced pivot levers along the side edge of the cover sheet. Various embodiments of the invention are shown and described in the following detailed description.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
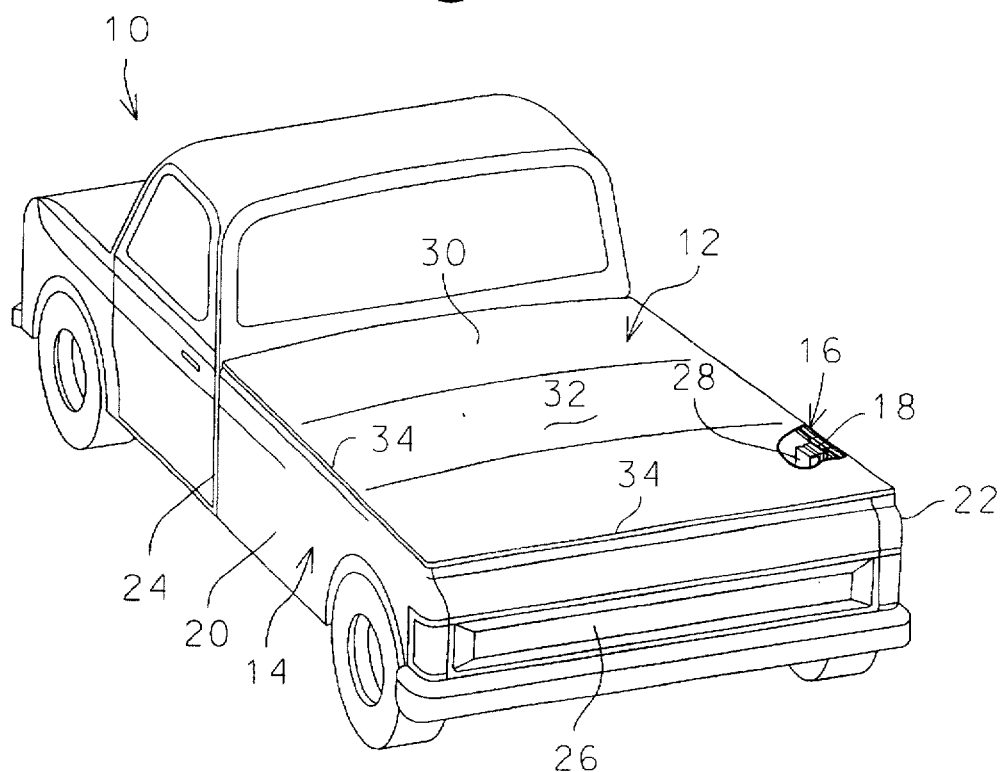
FIG. 1 is a perspective view of a pickup truck having a tonneau cover with a pivot lever and magnetic attachment according to the present invention installed thereon.

With reference to FIG. 1, a pickup truck 10 is shown having a tonneau cover 12 which is attached to the cargo box 14 according to the present invention. The tonneau cover 12 includes a frame 16, only a portion of which is visible. The frame 16 is comprised of a number of frame rails 18 which are attached to one another to form a rectangular frame. One frame rail 18 is partially exposed. The rectangular frame is placed upon the top of the cargo box sidewalls 20 and 22 as well as the top of the cargo box front wall 24 and tailgate 26. The frame 16 is attached to the cargo box by a plurality of clamps 28, only one of which is shown.

The tonneau cover 12 further includes a flexible cover sheet 30 which is drawn tightly over the frame 16 and attached to the frame 16 via the pivot lever and magnetic attachment of the present invention. The cover sheet 30 has a central region 32 which is bounded by side edges 34. The side edges 34 are positioned above the upper ends of the cargo box sidewalls so that the cover sheet can extend over the cargo box of the pickup truck.

Figure 2:
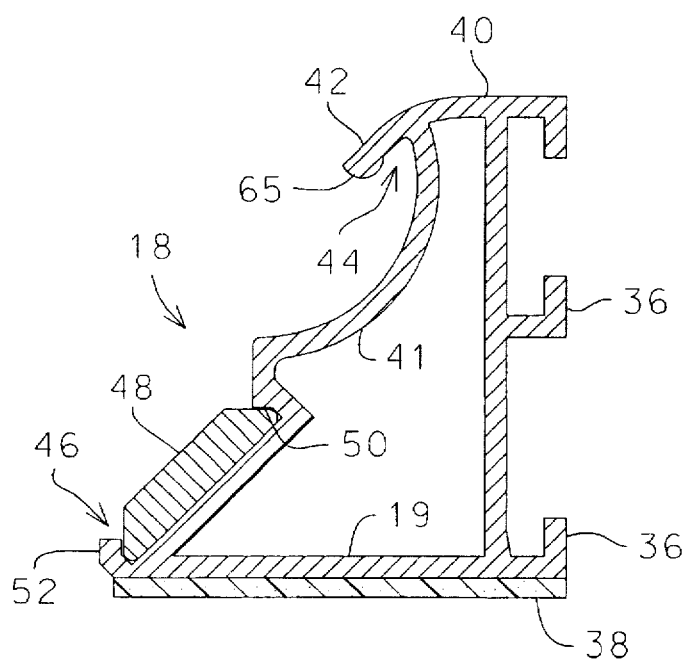
FIG. 2 is a sectional view as seen from substantially line 2—2 of FIG. 1 illustrating the frame rail of the tonneau cover.
Figure 3:
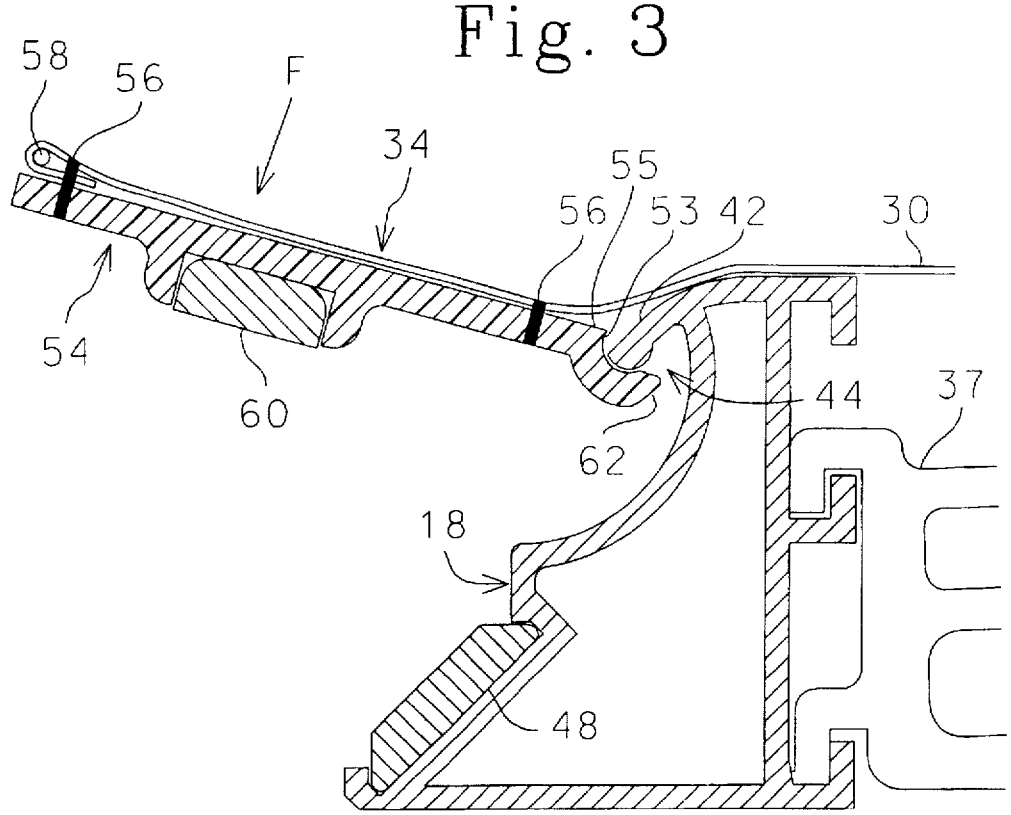
FIG. 3 is a sectional view similar to FIG. 2 showing the tonneau cover rail with the pivot lever used to attach the flexible sheet cover member to the rail in a position ready to mount the cover sheet to the rail.

With reference to FIG. 2, frame rail 18 is shown in cross section. Frame rail 18 is an elongated member which extends substantially the length of the cargo box side wall with a generally uniform cross section. Such a rail can be economically manufactured as an aluminum extrusion. However, other materials and or manufacturing processes could be used to form the frame rail. The rail 18, as shown in FIG. 2, includes a pair of upwardly open hooks 36 along its inner, or cargo box edge. The hooks 36 are used to couple the rail to the clamps 28 to secure the rail to the cargo box. A bracket 37 of the clamp 28 is shown in FIG. 3. Various types of attachments including clamps, nuts and bolts, etc. can be used to secure the rail to the cargo box and form no part of the present invention. The rail 18 further includes a lower wall 19 which rests upon the cargo box. For protection of the surface finish of the cargo box, a foam tape 38 is typically applied to the surface of the wall 19.

At the upper end of the rail 18, there is an upper wall 40. An outer wall 41 extends downward and outward from upper wall 40 to the lower wall 19. The upper wall 40 extends outward, beyond the outer wall 41, forming a lip 42. The outer wall 41 is recessed beneath the lip 42, forming an undercut or bight 44. Downwardly and outwardly from the bight 44, the outer wall 41 forms a channel 46. The channel 46 receives a magnet strip 48. Magnet strip 48 is retained beneath an angled surface 50 and a flange 52. Flange 52 is bent upward to the position shown to retain the magnet strip 48 after the magnet strip has been placed in the channel 46.

The flexible cover sheet 30 is attached to the rails by the operation of a pivot lever 54 shown in FIGS. 3–6. In the preferred embodiment, the pivot lever 54 is a plastic extrusion that extends the length of the rail 18. However, if desired, multiple pivot levers 54 could be attached to the flexible cover sheet at spaced intervals along the length of the side edge. The pivot lever 54 is sewn to the lower surface of the cover sheet along the side edge 34 by one or more seams 56. At the outer edge, the flexible cover sheet may be wrapped around a stiffening rod 58.

Figure 5:
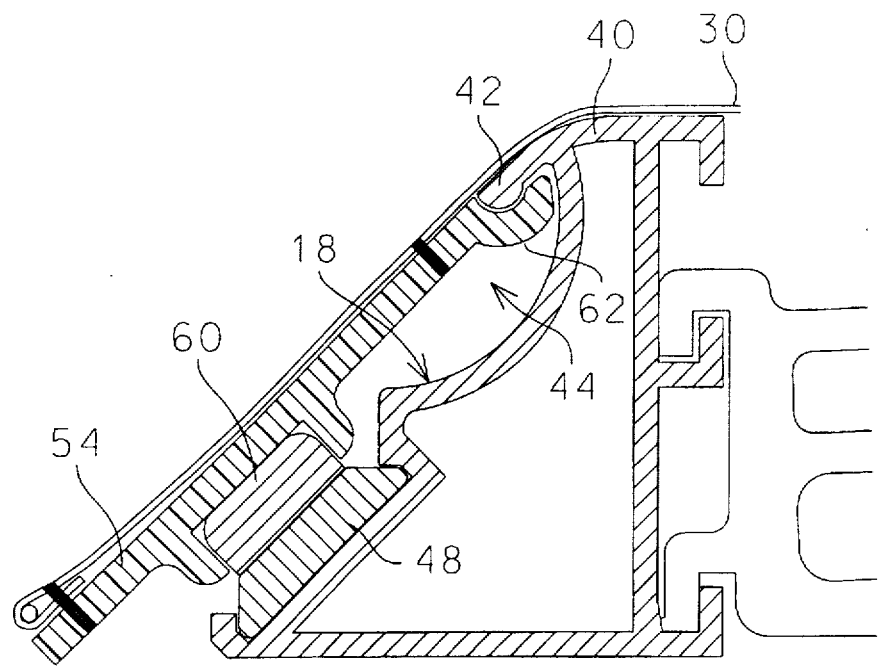
FIG. 5 is a sectional view similar to FIGS. 3 and 4 showing the pivot lever in the lock position.

Another magnet strip 60 is attached to the pivot lever for the purpose to be described below. The pivot lever has a proximal or inner end 62 which is adapted to be received into the bight 44 in the frame rail 18. The proximal end 62 is dish shaped, having a concave surface 53 so that the end 62 will fit into the bight 44 with the flat surface 55 of the pivot lever forming a continuation of the surface of the rail upper wall 40 (FIG. 5). The concave surface 53 engages the round surface 65 at the end of lip 42. This round surface forms a bearing surface that faces away from the cargo box.

Figure 4:
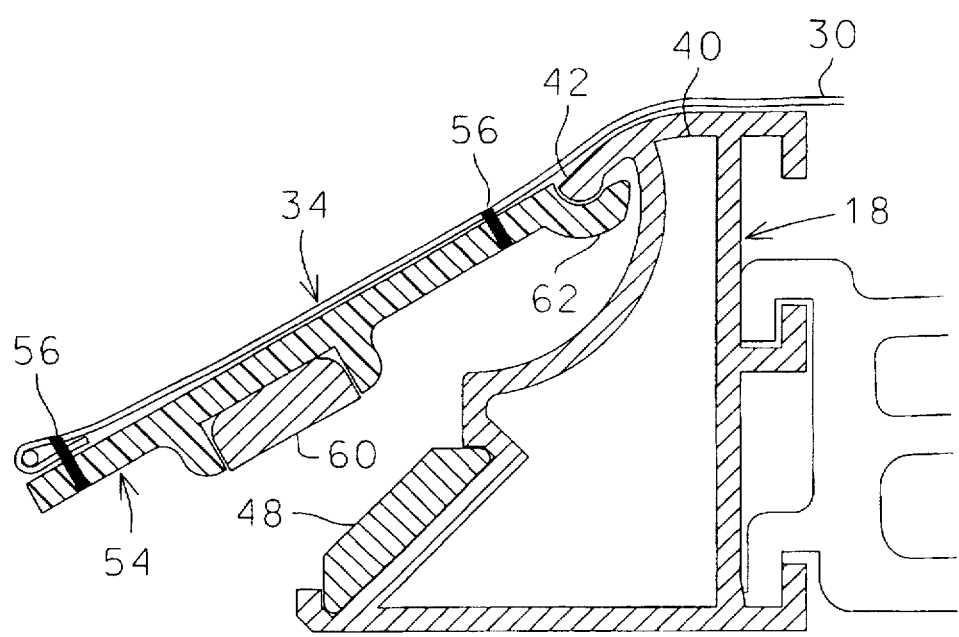
FIG. 4 is a sectional view similar to FIG. 3 showing the pivot lever in an intermediate position during rotation to the lock position.

In FIG. 3, the pivot lever 54 is shown in a position seated against the round bearing surface 65 of the lip 42. The pivot lever 54 is moved into a locked position by pushing downward on the pivot lever in the direction of the arrow F shown in FIG. 3. As this occurs, the lever rotates downward toward the magnet 48. Rotation continues as shown in FIG. 4 until the magnet 60 carried by the pivot lever engages the magnet 48 carried by the rail 18. In this position, the proximal end 62 of the pivot lever is seated into of the bight 44.

The force F acts over a large moment arm, the distance between the location of the force F and the concave surface 53 of the pivot lever which contacts the rail lip 42. Because of the mechanical advantage, the force F is relatively low compared to the tension developed in the cover sheet. As a result, a higher cover sheet tension can be generated compared to tonneau covers with other attachment mechanisms such as snaps or hook fasteners which do not have this mechanical advantage. Since the cover sheet tension is high, even with the normal variation in tension due to ambient temperature changes, the tension will always be high enough to avoid slack conditions in the cover sheet.

Figure 6:
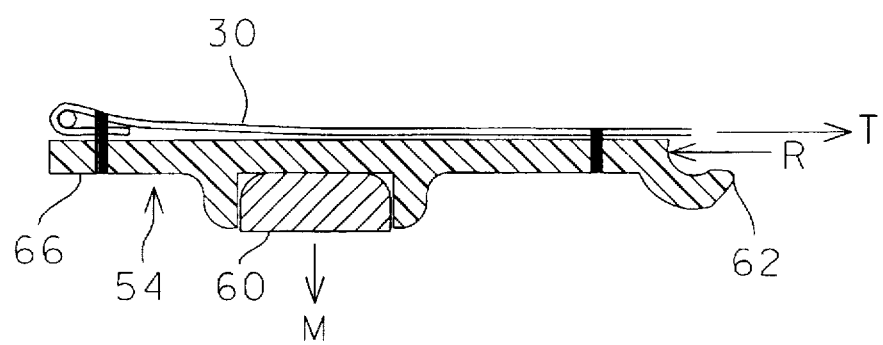
FIG. 6 is a sectional view of the pivot lever illustrating the forces acting on the lever when the cover sheet is attached to the rail.

With reference to FIG. 6, the various forces are shown which act on the pivot lever 54 when the cover sheet is attached to the rail. The tension in the cover sheet 30 creates a force T. This is resisted by the reaction force R acting on the concave surface of the dish shape proximal end 62 of the pivot lever. The forces T and R are not directly aligned with each other, thereby creating a moment tending to rotate the pivot lever clockwise as viewed in FIG. 6. It is preferable to configure the pivot lever and rail 18 such that the moment arm between the tension force T and reaction force R is as short as possible to minimize the resulting moment.

The two magnets 48 and 60 create a magnet force M acting downward on the pivot lever as shown in FIG. 6. This force M acts over a large moment arm, the distance between the magnet 60 and the surface 53, to resist the moment created by the forces T and R. Since the magnet moment arm is large compared to the cover sheet tension moment arm, the magnitude of the force M required to hold the pivot lever down is much smaller than the tension force T.

Removal of the cover sheet is accomplished by pushing upward on the distal end 66 of the pivot lever. Preferably the distal end 66 extends outward beyond the magnet 60, forming a release tab for applying the upward release force. It is only the relatively small magnet force M that must be overcome to release the cover sheet. The variation in the force M resulting from changes in ambient temperature is negligible. As a result, the force required to remove the cover sheet 30 remains fairly consistent over a large variation in ambient temperatures.

The pivot levers will typically be provided on the two side edges of the cover sheet and the rear edge. At the front of the cargo box, the cover sheet will be fixed to the rail. When the cover sheet is removed from the cargo box, it is rolled in a small spiral and stored at the front of the cargo box. The pivot levers are used on the remaining three sides to pull the cover sheet tight.

Figure 7:
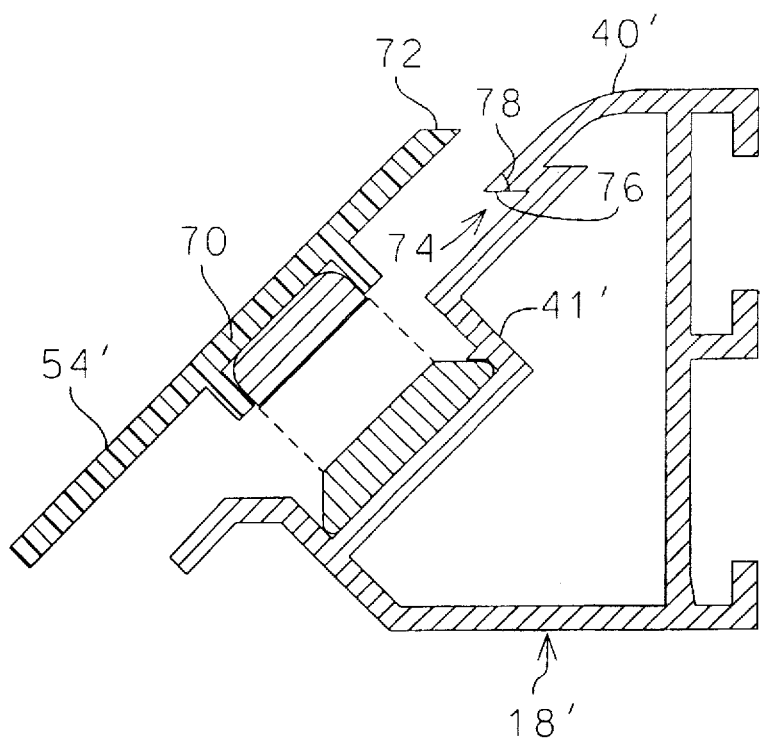
FIG. 7 is a sectional view similar to FIG. 5 illustrating an alternative embodiment of the rail and pivot lever.

An alternative embodiment is shown in FIG. 7. A pivot lever 54' is shown having a flat wall 70 ending with an angled surface 72 at its proximal end. A frame rail 18' has an upper wall 40' which is connected to the outer wall 41' forming an undercut 74. The undercut forms a flat bearing surface 76 which is inclined at an acute angle 78 to the surface of the upper wall 40. The surface 76 bears against the proximal end of the pivot lever 54' to resist the tension in the cover sheet 30. This embodiment creates a small moment arm between the tension in the cover sheet and the reaction force. Like the previous embodiment, the proximal end of the pivot lever 54' is seated beneath an undercut or a lip so that the proximal end of the pivot lever is not free to move upward away from the rail 18'.

Figure 8:
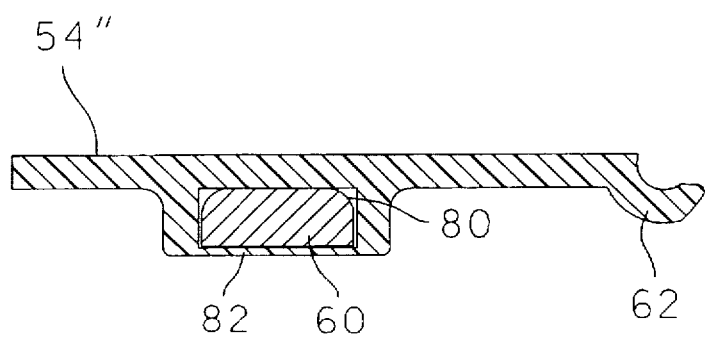
FIG. 8 is a sectional view of yet another embodiment of the pivot lever.

Yet another embodiment of the present invention is shown in FIG. 8. There a pivot lever 54" is shown having a magnet strip 60. Unlike the previous embodiments, the extruded plastic forming the pivot lever 54" has a closed channel 80 in which the magnetic strip 60 is disposed. A thin wall 82 of the plastic covers the surface of the magnet and forms the engaging surface of the pivot lever. Such an enclosed channel for the magnet is similar to the covered magnet strips used to seal refrigerator doors. Preferably the pivot lever is made of a flexible PVC or other plastic resin to enable the pivot lever to rolled in a coil as the cover sheet 30 is rolled to a storage position near the front of the cargo box. With the protective layer of plastic covering the magnet strip 60, it may be possible to hold the pivot lever in its locked position by contact of the covered magnet strip with the surface of the pickup truck cargo box. This would eliminate the magnet strip attached to the rail and also reduce the size and weight of the rail. The plastic wall 82 covering the magnetic strip would avoid marring the finished surface of the cargo box.

As another alternative construction, the cargo box wall may be equipped with a plastic molded upper cover. It is possible to mold this cover with a bearing surface for the proximal end of the pivot lever 54". With the provision of a bearing surface in the upper end of the cargo box, it may be possible to provide a tonneau cover that no longer requires separate frame rails attached to the cargo box side walls. Instead, the pivot lever 54" can rotate about the bearing surface in the molded plastic cover and the magnet engage the metal cargo box surface adjacent to the molded plastic cover.

Figure 9:
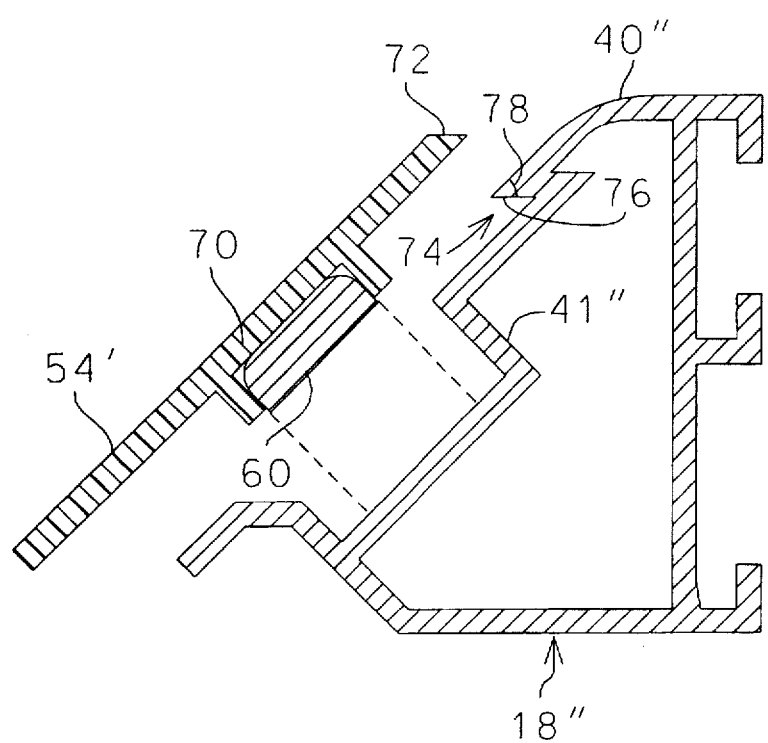
FIG. 9 is a sectional view of the rail and pivot lever illustrating another embodiment of the rail.

In another alternative embodiment, the magnet strip 48 can be deleted from the rail if the rail itself were made of a paramagnetic material. Such a case, is shown in FIG. 9 with the rail 18" where the magnet strip 60 of the pivot lever is attracted directly to the rail itself.

The tonneau cover of the present invention, having a pivot lever and a magnetic attachment to hold the pivot lever in place enables the tonneau cover sheet to be attached with attachment and removal forces that are consistent over a large range of ambient temperatures. The pivot lever is held in place by a magnetic force which is not susceptible to variations caused by ambient temperature. As a result, the release force necessary to remove the flexible cover sheet is fairly constant over a large range of temperatures. The pivot lever provides a mechanical advantage in pulling the cover tight with a relatively low force required by the user.

It is to be understood that the invention is not limited to the exact construction illustrated and described above, but that various changes and modifications may be made without departing from the spirit and scope of the invention as defined in the following claims.

We claim:

1. A tonneau cover for covering an area of a vehicle, the vehicle area being bounded by spaced walls each having an upper end and a generally outward facing bearing surface at the upper end of one of the walls, said tonneau cover comprising:

a flexible cover sheet having upper and lower surfaces and a central region bounded by side edges, said side edges being positionable above the upper ends of the vehicle walls so that said cover sheet extends over the area of the vehicle to be covered;

a pivot lever attached to the lower surface of said cover sheet at one side edge thereof and overlying the vehicle wall having the outward facing bearing surface at its upper end, said pivot lever having proximal and distal ends with said proximal end being closest to said central region of said cover sheet, said pivot lever proximal end having a pivot surface for engagement with the outward facing bearing surface at the upper end of the vehicle wall whereby the proximal end of the pivot lever can not be moved inward toward the area of the vehicle to be covered; and a magnet attached to said pivot lever and spaced outwardly from said proximal end of said pivot lever.

2. The tonneau cover of claim 1 wherein said magnet is spaced from both the proximal and distal ends of said pivot lever.

3. The tonneau cover of claim 1 wherein said pivot lever is an elongated member extending substantially the length of said side edge of said cover sheet and said magnet is a magnet strip extending substantially the length of said pivot lever.

4. The tonneau cover of claim 3 wherein said pivot lever has an elongated closed channel with said magnet strip disposed therein.

5. A tonneau cover for covering an area of a vehicle, said vehicle area being bounded by spaced walls each having an upper end, said tonneau cover comprising:

a flexible cover sheet having upper and lower surfaces and a central region bounded by side edges, said side edges being positionable above the upper ends of the vehicle walls so that said cover sheet can extend over the area of the vehicle to be covered;

a mounting member of a paramagnetic material adapted to be secured to the upper end of one of the walls, said mounting member having an upper surface which said cover sheet overlies when covering the area of the vehicle to be covered, said upper surface terminating with a projecting lip having a recess there beneath forming a bight, said mounting member forming a bearing surface facing outward away from the vehicle area to be covered;

a pivot lever attached to the lower surface of said cover sheet at the side edge thereof, said pivot lever having proximal and distal ends with said proximal end being closest to said central region of said cover sheet, said pivot lever proximal end having a pivot surface for engagement with said bearing surface of said mounting member whereby the proximal end of the pivot lever can not be moved inward toward the area of the vehicle to be covered; and a magnet attached to said pivot lever and spaced outwardly from said proximal end whereby said pivot lever can be rotated about said proximal end to bring said magnet into engagement with said mounting member to hold said mounting member in place.

6. The tonneau cover of claim 5 wherein said mounting member is an elongated member extending along the upper end of said one of the walls and said pivot lever is an elongated member extending substantially the length of said mounting member.

7. The tonneau cover of claim 6 wherein said magnet is a magnet strip.

8. The tonneau cover of claim 7 wherein said pivot lever has an elongated closed channel with said magnet strip being disposed therein.

9. A tonneau cover for covering an area of a vehicle, the vehicle area being bounded by spaced walls each having an upper end, said tonneau cover comprising:

a flexible cover sheet having upper and lower surfaces and a central region bounded by side edges, said side edges being positionable above the upper ends of the vehicle walls so that said cover sheet can extend over the area of the vehicle to be covered;

a mounting member adapted to be secured to the upper end of one of the vehicle walls, said mounting member having an upper wall which said cover sheet overlies when covering the area of the vehicle to be covered, said upper wall terminating with an outward facing bearing surface;

a pivot lever attached to the lower surface of said cover sheet at the side edge thereof, said pivot lever having proximal and distal ends with said proximal end being closest to said central region of said cover sheet, said pivot lever proximal end having a pivot surface for engagement with said outward facing bearing surface of said mounting member whereby the proximal end of the pivot lever can not be moved inward toward the area of the vehicle to be covered;

a first magnet attached to said pivot lever and spaced outward from said proximal end; and a second magnet attached to said mounting member and spaced outward from said outward facing bearing surface to confront said first magnet when said pivot lever proximal end is in engagement with said outward facing bearing surface and said pivot lever is pivoted downward and outward away from the area of the vehicle to be covered, said first and second magnets having their poles arranged so that said magnets attract one another to hold said pivot lever against said mounting member.

10. The tonneau cover of claim 9 wherein said first magnet is spaced from both the proximal and distal ends of said pivot lever.

11. The tonneau cover of claim 9 wherein said outward facing bearing surface of said upper wall is formed by an outward extending lip at a terminal end of said upper wall with a bight formed beneath said lip.

12. The tonneau cover of claim 9 wherein said mounting member is an elongated member extending along the upper end of said one of the sidewalls and said pivot lever is an elongated member extending substantially the length of said mounting member.

13. The tonneau cover of claim 12 wherein said first and second magnets are first and second magnet strips respectively.

14. The tonneau cover of claim 13 wherein said pivot lever has an elongated closed channel with said first magnet strip disposed therein.

15. A tonneau cover for covering an area of a vehicle, the vehicle area being bounded by upright walls each having an upper end, said tonneau cover comprising:

a flexible cover sheet having upper and lower surfaces and a central region bounded by side edges, said side edges being positionable above the upper ends of the vehicle walls so that said cover sheet can extend over the area of the vehicle to be covered;

an elongated, plastic strip attached to the lower surface of said cover sheet along at least one side edge thereof, said plastic strip, when viewed in a vertical section having proximal and distal ends with said proximal end being closest to said central region of said cover sheet; said plastic strip proximal end having a pivot surface for engagement with said outward facing bearing surface of said mounting member whereby the proximal end of the pivot lever can not be moved inward toward the area of the vehicle to be covered;

an elongated rail adapted to be secured to the upper end of one of the vehicle walls, said mounting member having an upper wall which terminates at an outer edge with an outward facing bearing surface;

said plastic strip proximal end having a pivot surface for engagement with said outward facing bearing surface of said elongated rail whereby the proximal end of the plastic strip can not be moved inward toward the area of the vehicle to be covered;

a first magnet attached to said plastic strip and spaced outward from said proximal end; and a second magnet attached to said elongated rail and spaced outward from said outward facing bearing surface to confront said first magnet when said plastic strip proximal end is in engagement with said outward facing bearing surface and said plastic strip is pivoted downward and outward away from the area of the vehicle to be covered, said first and second magnets having their poles arranged so that said magnets attract one another to hold said plastic strip against said elongated rail.

16. The tonneau cover of claim 9 wherein said outward facing bearing surface is oriented at an acute angle with respect to an upper surface of said upper wall of said elongated rail.

17. The tonneau cover of claim 15 wherein said first and second magnets are elongated first and second magnet strips.

18. The tonneau cover of claim 17 wherein said plastic strip has an elongated closed channel with said first magnet strip disposed therein.

* * * * *